Patented July 10, 1951

2,559,749

UNITED STATES PATENT OFFICE 2,559,749

FLUORINATED ALIPHATIC PHOSPHATES AS EMULSIFYING AGENTS FOR AQUEOUS POLYMERIZATIONS

Anthony F. Benning, Woodstown, N. J., assignor to E. I. du Pont de Nemours and Company, Wilmington, Del., a corporation of Delaware No Drawing. Application June 29, 1950,
Serial No. 171,247

8 Claims. (Cl. 260—92.1)

This invention relates to the polymerization of unsaturated organic compounds and, more particularly, to a process of preparing aqueous colloidal dispersions of polymers by polymerizing unsaturated organic compounds in aqueous medium.

Polymers of unsaturated compounds are conveniently handled in aqueous dispersions. In many cases, however, such dispersions are not readily obtainable, or not obtainable at all, by direct polymerization of the unsaturate in an aqueous medium in the presence of a dispersing agent. In many instances, polymerization either fails to take place, or proceeds only to a very low conversion; moreover, the polymer dispersion, if obtained, may be unstable and/or the particle size may be undesirably large. These failures, which are particularly noticeable for example with the haloethylenes such as tetrafluoroethylene or trifluorochloroethylene, have been attributed to the fact that conventional dispersing agents tend to terminate growing polymer chains prematurely.

An object of the present invention is to provide an improvement in the polymerization of unsaturated organic compounds in an aqueous medium to obtain a colloidal dispersion. A further object is to provide a convenient and economical method of preparing concentrated aqueous dispersions of polymers directly from polymerizable monomers. A still further object is to provide such a method wherein shorter polymerization cycles than heretofore feasible may be used. A more specific object is to provide such a method whereby dispersions of polymers characterized by being highly stable on storage and by the very small particle size of polymer, may be obtained. Other objects will be apparent from the description of the invention given hereinafter.

The above objects are accomplished according to the present invention by the step of carrying out the polymerization of the monomeric, ethylenically unsaturated organic compounds in an aqueous medium, in the presence of a water-soluble polymerization initiator and, as a dispersing agent, a water-soluble compound having the formula $(B(CF_2)_nCH_2)_2A$, wherein B is from the group consisting of hydrogen and fluorine, and $n$ is an integer from 2 to 4, inclusive, and A is a phosphate group.

Otherwise specified, the dispersing agents used in the process of this invention have the formula $(B(CF_2)_nCH_2O)_2PO(OM)$ wherein B is hydrogen or fluorine, $n$ is an integer from 2 to 4, inclusive, and M is hydrogen, alkali metal, ammonium, or substituted ammonium.

In a preferred form of the invention, particularly where the monomer to be polymerized is a haloethylene such as tetrafluoroethylene or trifluorochloroethylene, the polymerization is carried out in the presence of both a dispersing agent as defined above and, as a stabilizer, 0.1%–12%, by weight of the aqueous medium, of a saturated hydrocarbon having more than 16 carbon atoms and which is liquid under the polymerization conditions.

The present invention resides primarily in the discovery that the water-soluble polyfluoroalkyl phosphate compounds as herein defined act as surprisingly efficient dispersing agents and allow the preparation directly by the polymerization of monomeric, polymerizable unsaturated organic compounds in aqueous medium, of stable, concentrated aqueous colloidal dispersions of the respective polymers, such dispersions often showing concentrations of 15% to 30%, and even considerably higher, of polymer even in the case of fluoroethylenes where direct polymerization in aqueous systems is practically impossible to achieve with the use of conventional dispersing agents. Furthermore, in many cases, polymer of higher molecular weight is obtained by dispersion polymerization in the presence of polyfluoroalkyl phosphates than with the conventional dispersing agents. Moreover, the polyfluoroalkyl phosphates of the type defined herein lead to polymer dispersions in which the particle size of the polymer is extremely small, the particles usually having at least one dimension of less than 0.1 micron. In addition, the presence of a water-soluble polyfluoroalkyl phosphate often results in a considerable increase in the rate of polymerization.

The polymerization of the monomer in an aqueous medium containing a water-soluble polyfluoroalkyl phosphate compound and a water-soluble polymerization initiator is carried out in accordance with the known general procedures. Pressures of 1 to 3000 atmospheres and temperatures of 0° C. to 200° C. or higher can be used, the normally preferred ranges being a pressure of 1 to 1000 atmospheres and a temperature of 20° C. to 100° C. The initiator is a water-soluble free radical-producing initiator, preferably a water-soluble peroxy compound, which can be inorganic, e. g., persulfates, perborates, percarbonates, hydrogen peroxide, or organic, e. g., disuccinic acid peroxide. The most efficient and useful initiators are ammonium persulfate and alkali metal persulfates, e. g., sodium persulfate and potassium persulfate. There may also be used water-soluble azo initiators, e. g., disodium gamma,gamma′ - azobis(gamma-cyanovalerate) (U. S. Pat. 2,471,959), or alpha,alpha′-azodiisobutyramidine hydrochloride. The initiator is normally used in proportions of 0.001% to 5%, based on the weight of polymerizable monomer employed, 0.01% to 2% being preferred, although smaller or larger amounts may be used.

Optionally, it may be advantageous to include with the polymerization initiator a polymerization promoter such as a water-soluble salt of an oxidizable sulfoxy compound which yields sulfur dioxide on treatment with acids, e. g., sodium sulfite, sodium bisulfite, sodium thiosulfate, sodium hydrosulfite and the like. In addition, a small amount of a water-soluble ferrous salt, e. g., ferrous sulfate, is advantageously present in amount sufficient to provide from 0.2 to 50 parts per million of ferrous ions based on the weight of the aqueous medium. Also optionally, the aqueous polymerization system may include buffers such as borax, disodium phosphate, ammonium carbonate, sodium acetate and the like. Finely-divided inert solids serving as fillers may be included in the polymerization mixture, such as alumina, titanium dioxide, silica and the like. These inert solids are more advantageously employed as preformed aqueous colloidal dispersions.

Of the fluoroalkyl phosphate compounds falling within the class herein above defined, those wherein B is hydrogen and $n$ equals 2 or 4 are more particularly described and claimed in applicant's U. S. application Serial No. 171,246, filed of even date herewith. The starting materials used in preparing these esters are the fluorinated alcohols of the general formula $$H(CF_2CF_2)_nCH_2OH$$

which are described and claimed in U. S. application Serial No. 65,063, filed in the name of R. M. Joyce on December 13, 1948. These alcohols are prepared by treating tetrafluoroethylene and methanol at a temperature of 50° C. to 350° C. in the presence of a peroxy catalyst. There is obtained a mixture of alcohols of the above formula where $n$ varies from 1 to 12. The mixture can be separated into definite fractions by appropriate methods such as distillation, steam distillation, crystallization and the like, whereby the alcohols in which $n$ is 2 and 4, are obtained, these alcohols being used individually or in admixture with each other in the preparation of phosphates.

The compounds of the formula $(F(CF_2)_nCH_2)_2A$ can be prepared by using as starting materials the alcohols $CF_3(CF_2)_nCH_2OH$ wherein $n$ is an even or odd integer from 2 to 4, inclusive. These alcohols are in turn prepared by reduction of the corresponding carboxylic acids, $CF_3(CF_2)_nCOOH$ which have been recently described and which are made by electrolysis of the hydrocarbon acid or anhydride in hydrogen fluoride, thus forming the fluorinated acid fluoride which is subsequently hydrolyzed to the acid.

The dispersing agent (free acid or salt thereof) should be soluble in water to the extent of at least 0.1% at 100° C., in order to perform satisfactorily in aqueous polymerization systems. The free acids can be used with good results but preferably the salt-forming hydroxyl is salified with a base, which is preferably ammonia but may also be an alkali metal hydroxide such as sodium or potassium hydroxide or an aliphatic amine, e. g., an amine of one to six carbon atoms such as methylamine, ethylamine, cyclohexylamine and the like. The other salt-forming hydroxyl, if any, may be free or likewise salified.

The aforesaid application Serial No. 171,246 discloses the preparation of numerous phosphate compounds suitable for use as the dispersing agent in the present invention. For purposes of illustration typical preparations of two such compounds are given below:

(A) *Ammonium di(octafluoroamyl) phos-phate.*—To a refluxing mixture of 38 parts (0.28 mole) of phosphorus oxychloride and 0.5 part of pyridine was added gradually 116 parts (0.5 mole) of octafluoroamyl alcohol, $H(CF_2)_4CH_2OH$. After the evolution of hydrogen chloride had ceased, the product was fractionated to give two major fractions, the tri(fluoroalkyl) phosphate boiling at 161° C. at 7 mm. pressure and the di(fluoroalkyl) phosphate boiling at 200° C. at 5 mm. pressure. The latter (26 parts) was dissolved in 250 parts of boiling toluene. Upon addition of gaseous ammonia, the ammonium di(octafluoroamyl) phosphate precipitated as white, feathery crystals, M. P. 190° C.

Analysis calculated for $$(H(CF_2)_4CH_2O)_2PO(ONH_4)$$

P, 5.72; N, 2.58; neutralization equivalent, 543. Found: P, 5.83; N, 2.62; neutralization equivalent, 558.

(B) *Ammonium di(heptafluorobutyl) phosphate.*—The starting material was heptafluorobutyric acid, $CF_3(CF_2)_2COOH$, which is commercially available. This was reduced to heptafluorobutanol as follows. To a rapidly stirred, nitrogen-blanketed solution of 14.9 parts of lithium aluminum hydride in 140 parts of anhydrous ether was added dropwise a solution of 56 parts of heptafluorobutyric acid in 210 parts of anhydrous ether. When the exothermic reaction had ceased, 100 parts of water was added slowly and the reaction mixture was steam distilled to give a distillate consisting of a water layer and an organic layer. The water layer was saturated with sodium chloride, separated and washed with 70 parts of ether. The ether wash was combined with the original organic layer, dried and distilled. There was obtained 13.5 parts of heptafluorobutanol boiling at 92–95° C.

This material was cooled in a carbon dioxide-acetone bath and treated with 5.04 parts of phosphorus pentoxide. After the first exothermic reaction had subsided, the mixture was heated up to 180° C. over a period of one half hour, then distilled rapidly at 3 mm. pressure. The reddish, syrupy distillate was dissolved in 80 parts of boiling toluene and gaseous ammonia was bubbled through the solution. After the mixture had cooled, the tan-colored solid which had precipitated was filtered, washed with toluene, then with petroleum ether and filtered dry. There was obtained 11 parts of ammonium di(heptafluorobutyl) phosphate, $(CF_3CF_2CF_2CH_2O)_2PO(ONH_4)$, M. P. 185–210° C. with decomposition.

Similarly, other dispersing agents as herein defined can be readily prepared such as ammonium di(tetrafluoropropyl) phosphate (M. P. 147–153° C.)

The invention is illustrated in greater detail in the following examples in which parts are by weight unless otherwise noted.

Example I

A mixture of 0.5 part of monoammonium di(octafluoroamyl) phosphate, 0.05 part of potassium persulfate, 5 parts of paraffin (M. P. 56–58° C.), and distilled water to a total of 100 parts was placed in a pressure vessel having a volume capacity of 325 parts of water at room temperature, and heated to 71–74° C. The vessel was evacuated to remove air and then pressured to 51–54 lbs./sq. in. with tetrafluoroethylene gas. The vessel was agitated for 3.6 hours during which time the tetrafluoroethylene pressure was maintained at about 55 lbs./sq. in. by repressuring as needed. At the end of this time there was obtained a 24% dispersion of colloidal polytetrafluoroethylene.

Example II

A mixture of 0.1 part of potassium persulfate, 0.033 part of sodium bisulfite, 1.0 part of ammonium di(octafluoroamyl)phosphate, 90 parts of water and 10 parts of acrylonitrile was placed in a glass vessel which was swept with nitrogen, closed and agitated in a bath at 40° C. for 16 hours. There was obtained an aqueous dispersion of polyacrylonitrile containing 9.2% solids, corresponding to approximately 80% conversion of the monomer to polymer.

Example III

A mixture of 0.05 part of potassium persulfate, 0.033 part of sodium bisulfite, 2 parts of ammonium di(octafluoroamyl)phosphate, 60 parts of water and 40 parts of vinyl chloride was polymerized as in the preceding example. There was obtained an aqueous dispersion of polyvinyl chloride containing 15.3% solids.

Example IV

A mixture of 0.5 part of ammonium di(tetrafluoropropyl) phosphate, 0.05 part of potassium persulfate, 5 parts of paraffin and sufficient water to make up 100 parts was heated to 70–73° C. and deaerated by short boiling under reduced pressure. The mixture was maintained under 60 lbs./sq. in. tetrafluoroethylene pressure and agitated 5.8 hours at 70–73° C. There was obtained an aqueous polytetrafluoroethylene dispersion containing 17.6% solids.

Example V

Example IV was repeated except that the dispersing agent was ammonium di(heptafluorobutyl)phosphate and the reaction time was 3.5 hours. There was obtained an aqueous polytetrafluoroethylene dispersion containing 19.3% solids.

It will be understood that the above examples are merely illustrative and that the present invention broadly comprises the step of carrying out the polymerization of monomeric, ethylenically unsaturated organic compounds in an aqueous medium, in the presence of a water-soluble polymerization initiator and, as a dispersing agent, a water-soluble compound having the formula $(B(CF_2)_nCH_2)_2A$, wherein B is hydrogen or fluorine, $n$ is an integer from 2 to 4, inclusive and A is a phosphate group.

The amount of dispersing agent, i. e., of water-soluble polyfluoroalkyl phosphate compound, is not sharply critical. It can vary, for example, from 0.01% to 10% by weight of the aqueous medium (water) used, a preferred range being between 0.1% and 3%. In general, the lower the colloidal polymer concentration desired in a given time, the smaller may be the amount of dispersing agent used.

In one embodiment of the invention, particularly when the monomer to be polymerized is a haloethylene, it is advantageous to add to the aqueous medium, as a stabilizer, from 0.1% to 12%, based on the weight of the water, of a saturated hydrocarbon having more than 16 carbon atoms and which is liquid under the polymerization conditions. Preferably, the stabilizer is one or a mixture of several hydrocarbons having from 24 to 60 carbon atoms and is used in amounts of 1% to 5% by weight of the water in which the polymer dispersion is to be formed. Such hydrocarbons include eicosane, tetracosane, tetracontane, hexacontane, the mixture of hydrocarbons sold commercially as white mineral oil, and, particularly, the paraffin waxes melting at a temperature below that to be used in the polymerization, e. g., normally below 100° C. The use of these hydrocarbons as stabilizers in the polymerization of tetrafluoroethylene is more fully disclosed and claimed in U. S. application Serial No. 107,135, filed on July 27, 1949 in the name of S. G. Bankoff. These hydrocarbons act as stabilizers in the polymerization process, that is, they prevent or retard the formation of coagulated polymer or, in other words, they increase the ratio of polymer present as suspensoid relative to coagulated polymer. The mechanism of stabilization by the paraffin hydrocarbons is not definitely established. However, it is known that coagulation of certain polymers such as polytetrafluoroethylene and polychlorotrifluoroethylene is self-promoting in that the rate of coagulation increases rapidly once coagulation has started. It is also known that any coagulum is found, at the end of the polymerization, in the oil phase formed by the water-insoluble hydrocarbon, provided the coagulation is not permitted to exceed the capacity of the oil phase to absorb the coagulum. It is therefore believed that the hydrocarbon stabilizer sequesters adventitious coagulation nuclei arising from premature coagulation by any one of a number of possible causes. Thus, the coagulum is removed from the dispersion, forestalling the promotion of further coagulation.

The essential feature of the present invention is the use, as a dispersing agent, of a compound of the formula $(B(CF_2)_nCH_2)_2A$, wherein A is a phosphate group, which may be free or salified; B is hydrogen or fluorine; and $n$ is an integer from 2 to 4, inclusive.

The present invention is applicable broadly to the polymerization of monomeric, ethylenically unsaturated organic compounds in an aqueous medium. Any monomeric, ethylenically unsaturated organic compound adapted to be polymerized in aqueous media can be used although the invention naturally is of greater value as applied to the polymerization of those monomers most difficult to polymerize directly to obtain satisfactory colloidal dispersions of the polymers. The haloethylenes, particularly tetrafluoroethylene and chlorotrifluoroethylene, have proved as difficult as any of the monomers to polymerize directly to obtain colloidal dispersions of polymer and, hence, the invention is of outstanding value as applied to the haloethylenes.

The examples illustrate the invention as applied to monomeric compounds of widely different types including the difficult tetrafluoroethylene and various commonly used monomers which it has been possible to polymerize to give colloidal dispersions using conventional dispersing agents.

Monomeric unsaturated organic compounds adapted to be polymerized in aqueous media are, in general, well known to the art. Of these, all of which can be used in the present invention, the most important from the technological standpoint are the compounds having a terminal carbon-to-carbon double bond and the general formula

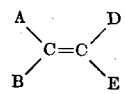

wherein A and B are hydrogen or halogen (fluorine, chlorine, bromine and iodine), and D and E are hydrogen, halogen, hydrocarbon (alkyl, cycloalkyl, aryl, aralkyl, alkylene, cycloalkylene, aralkylene), cyano, carboxy, carbalkoxy, acyloxy, aldehyde groups and the like. In addition to the monomers of the examples, there may be mentioned as important polymerizable compounds adapted for use in this invention: vinyl fluoride, vinyl bromide, vinyl iodide, 1,1-dichloroethylene, 1,1-difluoroethylene, vinylidene fluoride, vinylidene chloride, vinylidene bromide, vinylidene iodide, 1,3-butadiene, 2-fluoro-1,3-butadiene, 2-chloro-1,3-butadiene, 2-bromo-1,3-butadiene, ethylene propylene, isobutylene, styrene, propenylbenzene, vinylcyclohexene, 2-phenylbutadiene, methacrylonitrile, acrylic acid, methacrylic acid, methyl acrylate, ethyl acrylate, methyl methacrylate, butyl methacrylate, methyl alpha-chloroacrylate, vinyl formate, vinyl acetate, vinyl butyrate, and acrolein. Two or more monomers may be polymerized simultaneously, thus leading to copolymers.

There are a number of advantages deriving from the present invention. It provides a convenient and economical method of preparing concentrated aqueous dispersions of polymers directly from polymerizable monomers. In many cases, it permits much shorter polymerization cycles than have heretofore been feasible. The dispersions obtained often are far more concentrated than any heretofore obtainable directly by polymerizing the monomers in aqueous systems. The dispersions are highly stable on storage and, in general, they are characterized by a very small particle size. This is particularly characteristic of the polytetrafluoroethylene dispersions, in which case substantially all of the particles have at least one dimension less than 0.1 micron. In the case of polytetrafluoroethylene dispersions, moreover, a considerable number of the polymer particle are distinctly elongated, ribbon-like structures which are apparently rather stiff since they have no appreciable tendency to loop although they frequently appear in photomicrographs to be twisted along their axis. As shown by electron photomicrographs these ribbon-like particles have a thickness in the range of about 0.01 to 0.05 micron and a width of less than about 0.07 micron while their length ranges up to 4 microns and even more, with the ratio of length to width being at least 5:1 and in some instances as high as 400:1 or even higher. The proportion of these ribbon-like particles formed in the dispersion varies considerably as conditions vary. Although these dispersions are highly stable, it has been observed, particularly with the more concentrated dispersions, that part or all of the ribbon-like particles therein may flocculate on long standing but they can be redispersed at will simply by agitating the dispersion.

As more fully disclosed and claimed in application Serial No. 107,133 entitled "Aqueous Colloidal Dispersions of Polytetrafluoroethylene and the Formation of Shaped Structures Therefrom," filed in the name of K. L. Berry on July 27, 1949, polytetrafluoroethylene dispersions obtainable by the present process and containing at least 5% of the polymer particles in this ribbon-like shape may be extruded and coagulated to form filaments having a tenacity greater than 25 lbs./sq. in. before sintering. In view of the strength of the extruded and coagulated filament, it is entirely practical to spin these dispersions into filaments, which was not feasible with heretofore known dispersions because they would not form a filament having sufficient mechanical strength before sintering to handle.

The dispersions obtainable by the process of this invention have many valuable industrial applications. Thus, they are eminently suitable for the casting of coherent, flexible, strong films, either as unsupported pellicles or as coatings over wood, metal, wire screens, ceramics, textiles and the like. The films can conveniently be cast by treating the flow-out with an acid such as hydrochloric or sulfuric acid which coagulates the dispersion, or by exposing the flow-out to acidic vapors such as hydrogen chloride. Wire coatings of superior properties are readily obtained by heating wires coated from concentrated dispersions. Fibrous materials, including cotton, wool, silk, glass fabrics, asbestos, paper, and the like, can be impregnated with these dispersions, which are then coagulated by treatment with an acidic agent and/or heat and/or any drying process to eliminate water.

As many apparently widely different embodiments of this invention may be made without departing from the spirit and scope thereof, it is to be understood that the invention is not limited to the specific embodiments thereof except as defined in the appended claims.

The invention claimed is:

1. In the polymerization of a monomeric, ethylenically unsaturated organic compound in an aqueous medium to obtain a colloidal dispersion of polymer, the step of carrying out said polymerization in the presence of a water-soluble polymerization initiator and, as a dispersing agent, a compound having the formula $$(B(CF_2)_nCH_2)_2A$$

wherein B is from the group consisting of hydrogen and fluorine, $n$ is an integer from 2 to 4, inclusive, and A is a phosphate group, said compound having a solubility in water of at least 0.1% at 100° C.

2. Process as set forth in claim 1 wherein said compound functioning as a dispersing agent is present in the amount of 0.01%–10% by weight of said aqueous medium.

3. Process as set forth in claim 1 wherein said compound functioning as a dispersing agent is present in the amount of 0.1%–3% by weight of said aqueous medium.

4. Process as set forth in claim 3 wherein said monomeric, ethylenically unsaturated organic compound is from the group consisting of tetrafluoroethylene and chlorotrifluoroethylene.

5. Process as set forth in claim 1 wherein said monomeric, ethylenically unsaturated organic compound is from the group consisting of tetrafluoroethylene and chlorotrifluoroethylene.

6. Process as set forth in claim 1 wherein said compound functioning as a dispersing agent is ammonium di(tetrafluoropropyl) phosphate.

7. Process as set forth in claim 1 wherein said compound functioning as a dispersing agent is ammonium di(heptafluorobutyl) phosphate.

8. Process as set forth in claim 1 wherein said compound functioning as a dispersing agent is ammonium di(octafluoroamyl) phosphate.

ANTHONY F. BENNING.

No references cited.